United States Patent
Ramaswamy et al.

(10) Patent No.: US 8,639,409 B2
(45) Date of Patent: Jan. 28, 2014

(54) SYSTEM FOR MANAGING ELECTRICAL POWER DISTRIBUTION BETWEEN INFRASTRUCTURE AND ELECTRIC VEHICLES

(75) Inventors: Deepak Ramaswamy, Ypsilanti, MI (US); Sujit Phatak, Farmington Hills, MI (US)

(73) Assignee: Hitachi, Ltd, Tokyo (JP)

( * ) Notice: Subject to any disclaimer, the term of this patent is extended or adjusted under 35 U.S.C. 154(b) by 577 days.

(21) Appl. No.: 12/894,214

(22) Filed: Sep. 30, 2010

(65) Prior Publication Data

US 2012/0083932 A1    Apr. 5, 2012

(51) Int. Cl.
| | | |
|---|---|---|
| G01M 17/00 | (2006.01) | |
| G05D 3/12 | (2006.01) | |
| G05D 5/00 | (2006.01) | |
| G05D 9/00 | (2006.01) | |
| G05D 11/00 | (2006.01) | |
| G05D 17/00 | (2006.01) | |
| G01R 21/00 | (2006.01) | |
| G01R 31/36 | (2006.01) | |

(52) U.S. Cl.
USPC .............. 701/31.5; 701/22; 701/23; 700/291; 700/295; 700/297; 702/61; 702/62; 702/63

(58) Field of Classification Search
USPC ............. 700/291, 295, 297; 701/22–23, 31.5; 702/60–63
See application file for complete search history.

(56) References Cited

U.S. PATENT DOCUMENTS

| | | | |
|---|---|---|---|
| 2003/0085621 A1* | 5/2003 | Potega | 307/18 |
| 2005/0065684 A1* | 3/2005 | Larson et al. | 701/36 |
| 2007/0203643 A1* | 8/2007 | Ramaswamy et al. | 701/211 |
| 2009/0210357 A1* | 8/2009 | Pudar et al. | 705/412 |
| 2009/0218987 A1* | 9/2009 | Tominaga | 320/134 |
| 2009/0240429 A1* | 9/2009 | Tanaka et al. | 701/202 |
| 2010/0076825 A1* | 3/2010 | Sato et al. | 705/14.1 |
| 2010/0082277 A1* | 4/2010 | Ballard | 702/63 |
| 2010/0131134 A1* | 5/2010 | Wallace | 701/22 |
| 2010/0138066 A1* | 6/2010 | Kong | 700/295 |
| 2010/0181780 A1* | 7/2010 | Gillett | 290/1 R |
| 2011/0004358 A1* | 1/2011 | Pollack et al. | 700/297 |
| 2012/0147783 A1* | 6/2012 | Shaffer et al. | 370/254 |
| 2012/0271758 A1* | 10/2012 | Jammer | 705/39 |
| 2013/0067253 A1* | 3/2013 | Tsuda | 713/300 |

* cited by examiner

Primary Examiner — Ramesh Patel
(74) Attorney, Agent, or Firm — Douglas W. Sprinkle

(57) ABSTRACT

A system for managing electrical power requirements between at least two power grids including a number of automotive vehicles each of which has an electric motor which propels the vehicle at least partly during its operation. An electric battery is contained in each vehicle as well as a wireless transmitter. A processor contained within each vehicle communicates with the wireless transmitter to transmit information to a base station indicative of the state of charge of the battery, vehicle identification information, and vehicle destination. The base station or upstream entity processes the data from the multiple vehicles to estimate the geographic power requirements necessary to recharge the batteries and then redirects power among at least two different power grids in order to meet those geographic power requirements.

12 Claims, 5 Drawing Sheets

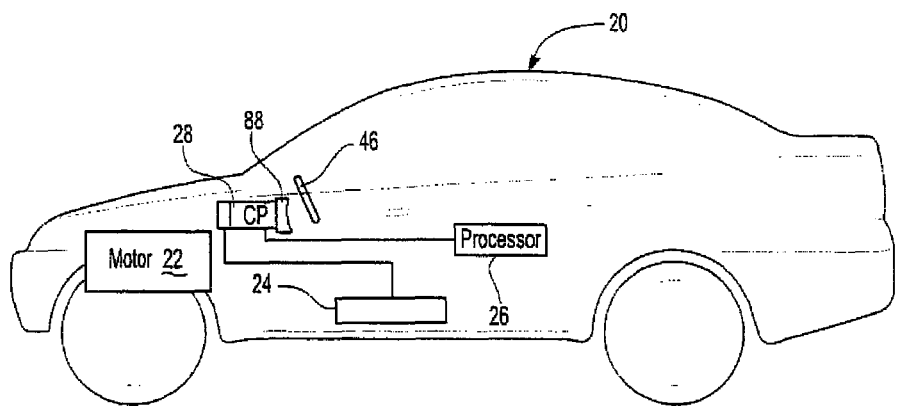
Fig-1
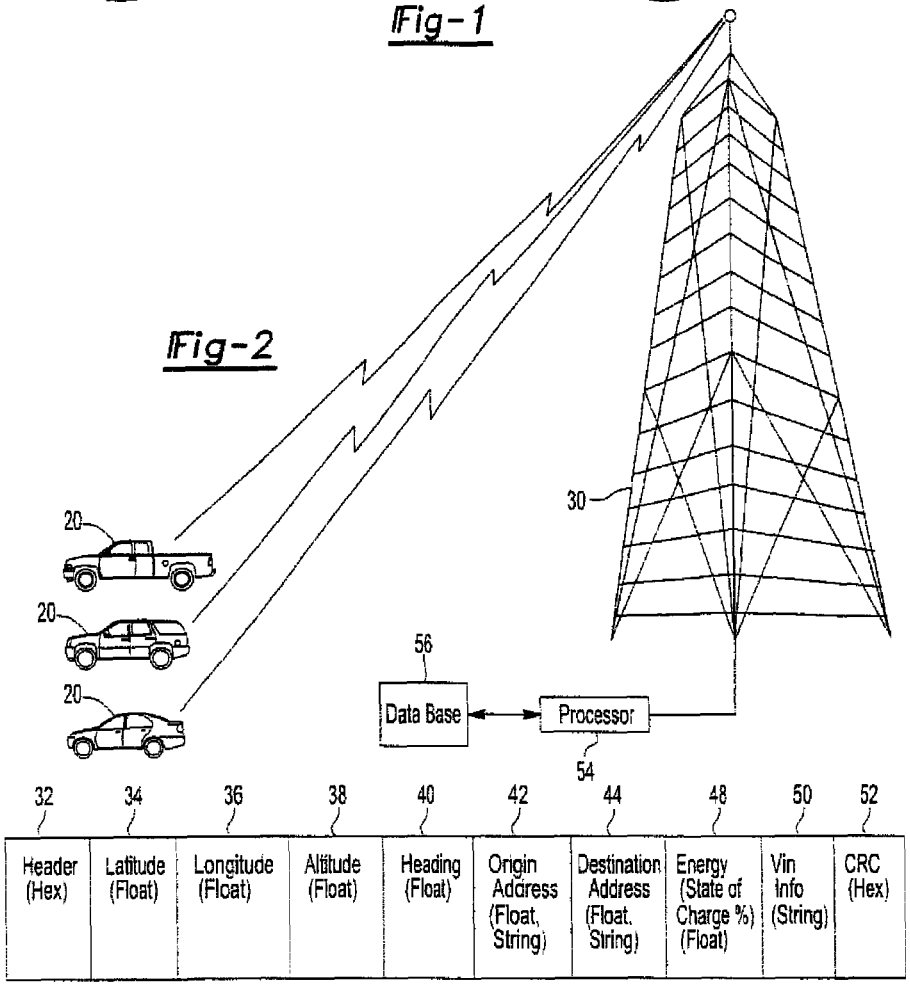
Fig-2
Fig-3

| | Time | Vehicle # | Start Loc | End Loc | Current Loc | SoC | Area | Source |
|---|---|---|---|---|---|---|---|---|
| | 11:59 | Vehicle ID1 | 41.29,-13.38,1200 | 51.07,-13.31,5200 | 41.29,13.38,1200 | 89 | Ann Arbor | Cell |
| | 11:59 | Vehicle ID2 | 71.48,-23.48,343 | 51.58,-88.32,443 | 81.09,-08.82,349 | 90 | Ann Arbor | Utility |
| | 11:59 | Vehicle ID3 | 81.59,-83.68,177 | 11.50,-43.93,157 | 11.55,-53.23,107 | 12 | Farmington | Cell |
| Updated | • | • | • | • | • | • | • | • |
| | 11:59 | Vehicle ID4 | 21.00,-93.98,99 | 11.00,-05.64,55 | 91.32,-85.35,552 | 10 | Troy | Utility |
| | • | • | • | • | • | • | • | • |
| | • | • | • | • | • | • | • | • |
| | 12:01 | Vehicle ID1 | 41.29-13.38,1200 | 51.07,-13.31,5200 | 41.20,76.78,190 | 89 | Ann Arbor | Cell |
| Updated | • | • | • | • | • | • | • | • |
| | 12:21 | Vehicle ID1 | 41.29-13.38,1200 | 51.07,-13.31,5200 | 51.08,-12.33,5200 | 94 | Farmington | Utility |

SYSTEM FOR MANAGING ELECTRICAL POWER DISTRIBUTION BETWEEN INFRASTRUCTURE AND ELECTRIC VEHICLES

BACKGROUND OF THE INVENTION

I. Field of the Invention

The present invention relates to a method and system for managing electrical power requirements between at least two different power grids as a function of received data from electrically powered vehicles which transmit information to a base station indicative of the state of charge of the battery within the vehicles.

II. Description of Material Art

Electrically powered automotive vehicles, including hybrid electric vehicles, are powered at least in part by an electric motor. Such electric vehicles have enjoyed increased popularity due in large part to their economical operation and are expected to further increase in popularity in the future.

Most electric vehicles derive their electric power from a battery contained on the vehicle. The amount of electrical power that can be stored within any given battery of the vehicle is finite so that the battery must he periodically recharged in order to enable continued operation of the electric vehicle. The amount of electrical power remaining within the battery is known as the "state of charge" of the battery.

As the number of electric vehicles in operation continues to increase, the electrical power requirements necessary to recharge the batteries will likewise increase to the extent that, unless properly managed, such power requirements may overload the power grid utilized to recharge the battery.

In most developed nations, electrical power distribution is divided into numerous local power grids wherein each local power grid provides the electrical power for a predetermined geographic area. For example, one power grid may cover a primarily residential area whereas the adjacent power grid covers an area that is primarily industrial. Furthermore, since it is anticipated that electric vehicles will be recharged at the home of the vehicle owner, the electrical power requirements of the power grid covering the residential area may increase substantially beginning about 5:00 p.m. when the electric vehicle owners return home and begin charging their electric vehicle. Conversely, the power requirements for the power grid covering the primarily industrial area may decrease due to the cessation of the industrial operation after 5:00 or 6:00 p.m.

In order to obtain the most efficient and cost-effective operation of the overall electrical power distribution system, it would be advantageous to anticipate and redistribute the overall available electrical power to the various different geographic power grids in anticipation of the power requirements of that particular power grid especially to accommodate electric vehicles.

SUMMARY OF THE PRESENT INVENTION

The present invention provides a method and system for managing electrical power distribution requirements between at least two power grids especially to accommodate the power recharging needs of electric vehicles and hybrid electric vehicles (hereinafter collectively referred to as electric vehicles).

In brief, the system of the present invention includes a plurality of electric automotive vehicles wherein each vehicle has an electric motor that propels the vehicle at least partly during the operation of the vehicle. An electric battery is also contained within each vehicle to power the electric motor in the electric vehicle.

A wireless transmitter, such as a cellular phone, is also contained within the vehicle. A processor in the vehicle is programmed to communicate the state of charge of the battery, vehicle identification information, as well as the vehicle destination to the transmitter which then periodically transmits the data to a base transceiver station.

The base station receives the transmitted data from the multiple vehicles and then estimates the geographic power requirements necessary to recharge the vehicle batteries when the vehicles reach their destination or a waypoint. That base station is further programmed to provide information to power manufacturers so that the power manufacturers may redirect electrical power among at least two power grids as a function of the estimated geographic power requirements. This enables more efficient distribution of electrical power and reduces the chance of an overload of a power grid.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a diagrammatic view of an electric vehicle utilized in accordance with the present invention;

FIG. 2 is a diagrammatic view illustrating the system of the present invention;

FIG. 3 is a diagrammatic view illustrating an exemplary data packet;

DETAILED DESCRIPTION OF A PREFERRED EMBODIMENT OF THE PRESENT INVENTION

Figures 4, 5:
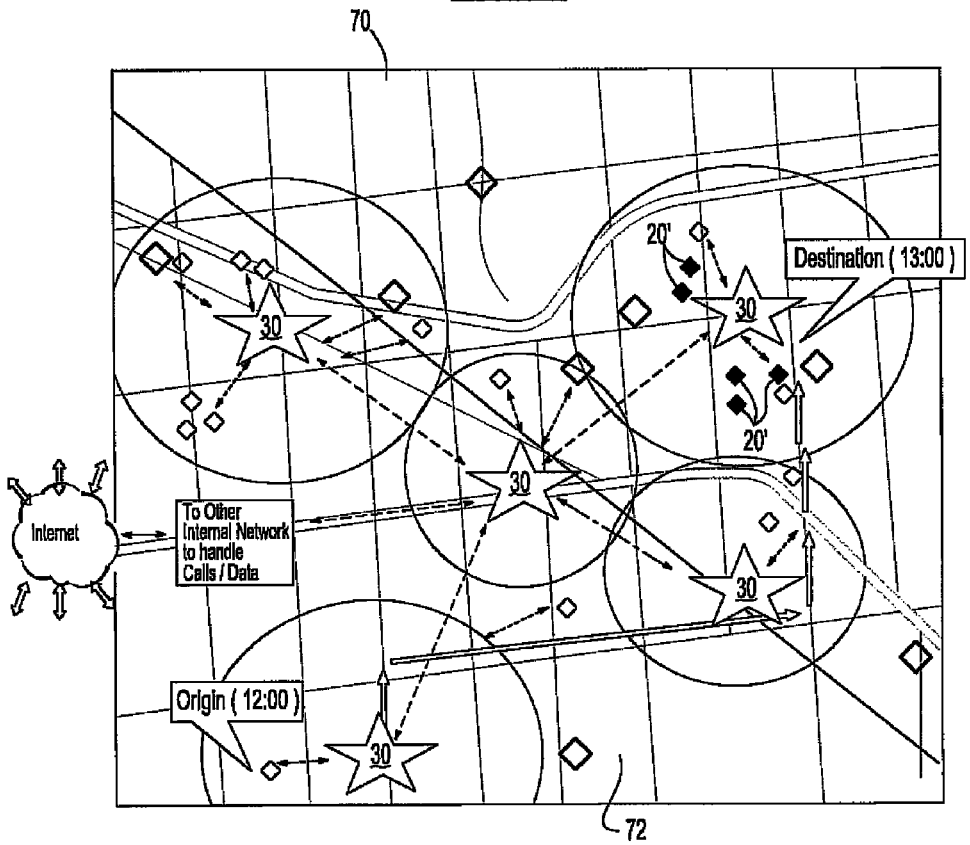
FIG. 4 is a view illustrating an exemplary database structure for use with the present invention.
FIG. 5 is a diagrammatic view illustrating an electrical distribution system.

With reference first to FIG. 1, an electric vehicle 20 is illustrated. The electric vehicle 20 includes an electric motor 22 which propels the vehicle 20 at least in part during the operation of the vehicle 20. The vehicle 20, therefore, may be an all-electric vehicle, i.e. in which the motor 22 powers the vehicle 20 all of the time during the operation of the vehicle, or a hybrid electric vehicle which is partly powered by the electric motor 22 and also by an internal combustion engine such that either the electric motor 22 or the internal combustion engine, or both, propels the vehicle 20 at any given time.

The electric vehicle 20 includes a battery 24 which stores electrical energy used to power the electric motor 22. The storage capacity of the battery 24, furthermore, may vary from vehicle to vehicle, as well as from one type of vehicle to a different type of vehicle.

For example, an electric vehicle 20 in the form of a pickup truck may have higher power requirements for the electric motor 22 in order to carry heavier loads than a passenger vehicle. Consequently, if the automotive vehicle 20 is a pickup truck, the capacity to store electrical power in the battery 24 may be higher than for a passenger vehicle. Consequently, more electrical energy is consumed while charging the battery 24 with a higher electrical storage capacity than a lower capacity battery 24.

A processor 26 within the vehicle 20 communicates with the battery 24 and calculates the state of charge of the battery 24. The state of charge of the battery 24 is expressed as a percentage with 100% equaling a fully charged battery and 0% equal to a depleted battery 24. Consequently, the state of charge of the battery 24 coupled with the capacity of the battery 24 equates to the amount of electrical power stored in the battery 24. The storage capacity of the battery 24 can be determined by the vehicle identity.

The processor 26 also communicates with a wireless transmitter 28 contained in the vehicle 20. The wireless transmitter 28 is preferably a cellular telephone dedicated to the vehicle 20.

With reference now to FIGS. 1 and 2, under control of the processor 26, the cellular telephone 28 transmits data to a base transceiver station 30 that services a predefined geographic area, e.g. an area having a radius of four miles around the base station 30. Furthermore, each vehicle 20 iteratively transmits information, e.g. five times per second, so that the information transmitted to the base station 30 essentially is indicative of real time.

The information transmitted from the vehicle 20 to the base station 30 includes vehicle identification information so that the capacity of the battery 24 may be determined, the vehicle destination, and the state of charge of the battery. Although any data format may be utilized, an exemplary data format is illustrated in FIG. 3.

With reference then to FIG. 3, the exemplary data format or data packet for the transmission from the vehicle 20 and to the base station 30 includes a header 32 containing a known sequence of hexadecimal bytes which identify the beginning of the data transmission. For example, a header such as 0xAB 0xBA 0xAB 0xBA could be used as the header 32. It would be very unlikely that such a sequence of bytes would ever form actual data of the data transmission.

Following the transmission of the header 32, a latitude floating point number 34, longitude floating point number 36, and altitude floating point number 38 are then transmitted to the base station. These three floating point numbers would be indicative of the current position of the automotive vehicle. Since the processor 26 preferably activates the transmitter 28 numerous times per second, the latitude number 34, longitude number 36, and altitude number 38 provide the location of the vehicle almost on a real-time basis.

A heading floating number 40 indicating the direction of movement of the vehicle 20 followed by a starting address string 42 and ending address or destination string 44 are then transmitted from the vehicle 20 to the base station 30. The heading number 40 is indicative of the direction of the vehicle while the starting address string is indicative of the address at the beginning of the trip. The end address string 44 contains the destination or a waypoint for the vehicle 20. Typically, the end address string 44 is obtained from a navigation system 46 (FIG. 1) contained in the vehicle 20.

A state of charge number 48 is then sent as data to the base station 30. This state of charge number 48 will vary between 0 and 100 indicative of the percent of electrical charge contained in the battery 24. The state of charge number 48 is followed by a vehicle identification string 50 so that the type of vehicle and type of battery 24 can be determined. Finally, a checksum number 52 is transmitted so that the base station 30 can check for and possibly correct errors in the transmission.

The data packet illustrated in FIG. 3 is transmitted by the transmitter 28 while the vehicle is in operation or parked, but not connected to a power grid. However, if the vehicle 20 is currently being recharged by an electrical connection to the electric utility, the data packet of FIG. 3 may alternatively be transmitted through the utility connection to the base station 30.

With reference to FIG. 2, the base station 30 communicates its received data packets from the vehicles 20 to a base station processor 54. It will also be appreciated that the processor 54 may receive data packets from several base stations 30 within a particular geographic area such that the processor 54 covers a geographic area potentially larger than that covered by the base station 30.

The processor 54 also has access to a database 56 which retains data in persistent memory. The database 56 may have any conventional construction, such as a hard drive storage.

With reference now to FIG. 4, an exemplary format of storage in the database 56 is illustrated. In particular, each entry in the database includes a time field 60 and a vehicle identification field 62. A start location field 64 is followed by an end location 66 as well as the current location 68. Finally, a state of charge field 70 followed by a geographic area field 72 and the source field 74 of the information, i.e. either by transmission from the transmitter 28 or via a utility power line.

These data fields, furthermore, may be periodically updated. For example, the data for the vehicle D1 originally received at 11:59 is updated both at 12:01 as well as 12:21. It will be understood, of course, that the data format illustrated in FIG. 4 is by way of example only and that other data formats may alternatively be employed.

Since the base station 30 and its associated processor 54 receive the data from the vehicles indicating not only their destination but also type and state of charge, the processor is programmed to estimate the electrical power requirements necessary to recharge the electric vehicles in different geographic areas. Furthermore, adjacent geographic areas may be serviced by different power grids, also known as power substations.

Environmental factors, e.g. temperature, humidity, snow, rain, etc. may also form data that is processed. Such environmental factors may be identified at the base station or may be received from the vehicle's data transmission as determined by sensors on the vehicle. For example, the vehicle may send data if available from a sensor to the base station 30. If the base station 30 receives data, it uses that data. Otherwise, the base station substitutes environmental data obtained at the base station 30.

Alternatively, the base station 30 may convey the collected data without processing to an upper level, e.g. a power provider. The upper layer would then process the data as required.

For example, with reference to FIG. 5, a plurality of base stations 30 are illustrated each having a geographic area of coverage represented by the circle around each base station 30, Furthermore, the geographic area illustrated in FIG. 5 is divided into two different power grids 70 and 72 separated in this example by a diagonal line so that each power grid area 70 and 72 as shown in FIG. 5 is triangular in shape. The base stations 30, furthermore, may cover areas that overlap the two power grid areas 70 and 72.

Still referring to FIG. 5, a number of different vehicles with depleted or nearly depleted batteries are illustrated at 20' and thus will require to be recharged from the power grid area 70. Consequently, by programming the base station processor 54 to estimate the number of vehicles requiring recharging, and the amount of energy required for that recharging at any particular time, the processor 54 is then programmed to redistribute or redirect electrical power from one grid 72 and to the other grid 70 in order to accommodate the recharging of electric vehicles.

In order to estimate the electrical power needed to recharge electric vehicles in the power grid 70, the processor 54 is programmed to determine the number of electric vehicles 20 that will be in a power grid area 70 at a particular time, e.g. 5:00 and the energy necessary to recharge those vehicles by the following equation:

$$\text{State of charge} = N1*(100-S1')*W1 + N2*(100-S2')*W2 \ldots Nm*(100-Sm')*Wm$$

where $Nx$=the number of type x vehicles with battery size x;

$Sx'$=the state of charge for the vehicle type $x \pm$ tolerance $Tx$;

and $Wx$=the battery capacity for the vehicle type x;

where the vehicle type x would differentiate between compacts, sedans, luxury cars, etc.

It is also possible to estimate the future energy requirements in a particular area for a power grid during a future time period. For example, by knowing the home address of each vehicle, an estimated load may be computed that would be required in a certain time period, e.g. 6:00 p.m. and 8:00 p.m., based upon the vehicle's current status, i.e. whether it is being operated or charged, and the probability that the vehicle will be returned to its home address during that time period. Thus, the calculation of the required state of charge may be multiplied by a probability which may be determined empirically.

Figure 6:
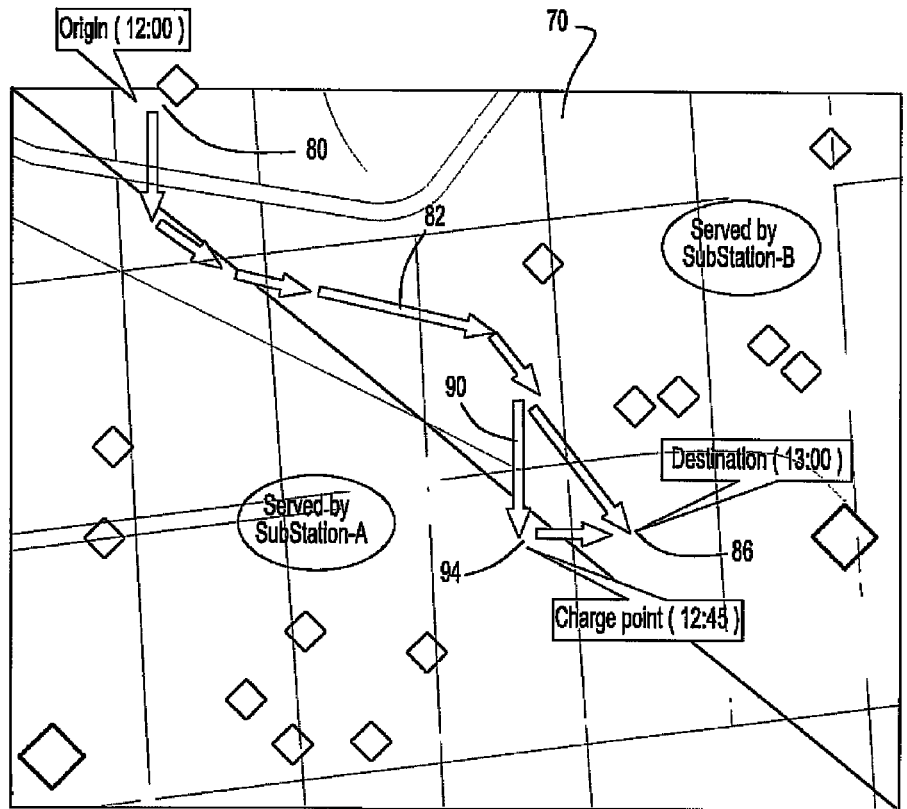
FIG. 6 is a view similar to FIG. 5, but illustrating vehicle rerouting.
Figure 7:
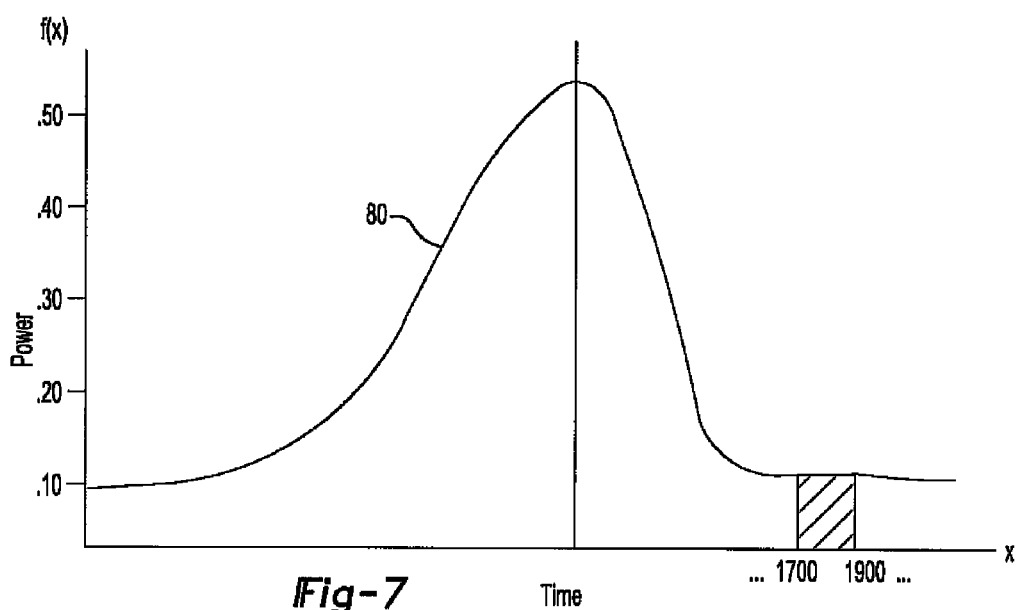
FIG. 7 is a graph illustrating an exemplary power versus time of electrical distribution.

Lastly, the power requirements for a particular power grid 70 or 72 may be determined statistically. For example, as shown in FIG. 7, a power requirement curve 80 is illustrated based on statistical data and illustrated as a function of time. Consequently, as seen in FIG. 6, the power requirements for a particular grid 70 or 72 may be vary as a function of the time of day as well as the function of the day of the week. The processor 54 is then programmed to distribute electrical energy between the grids 70 and 72 as a function of the statistical requirements.

With reference now to FIG. 6, a vehicle trip is illustrated along path 82 from a point of origin 84 and to a destination 86. In the event that the processor 54 determines that there is insufficient electrical energy within the power grid 70 to recharge the battery for the vehicle at its destination 86 in the power grid 70, the base station 30 may transmit a signal back to a receiver 88 (FIG. 1) within the vehicle 20. The receiver 88 is combined with the transmitter 28, such as a cellular phone. In this case, the base station 30 reroutes the vehicle 20 to an alternate route, illustrated at 90, to reroute the vehicle into the adjacent power grid area 72 for recharging at a charging station 94 in the power grid area 72. In this fashion, the possibility of overloading the power grid area 70 can be reduced.

Figure 8:
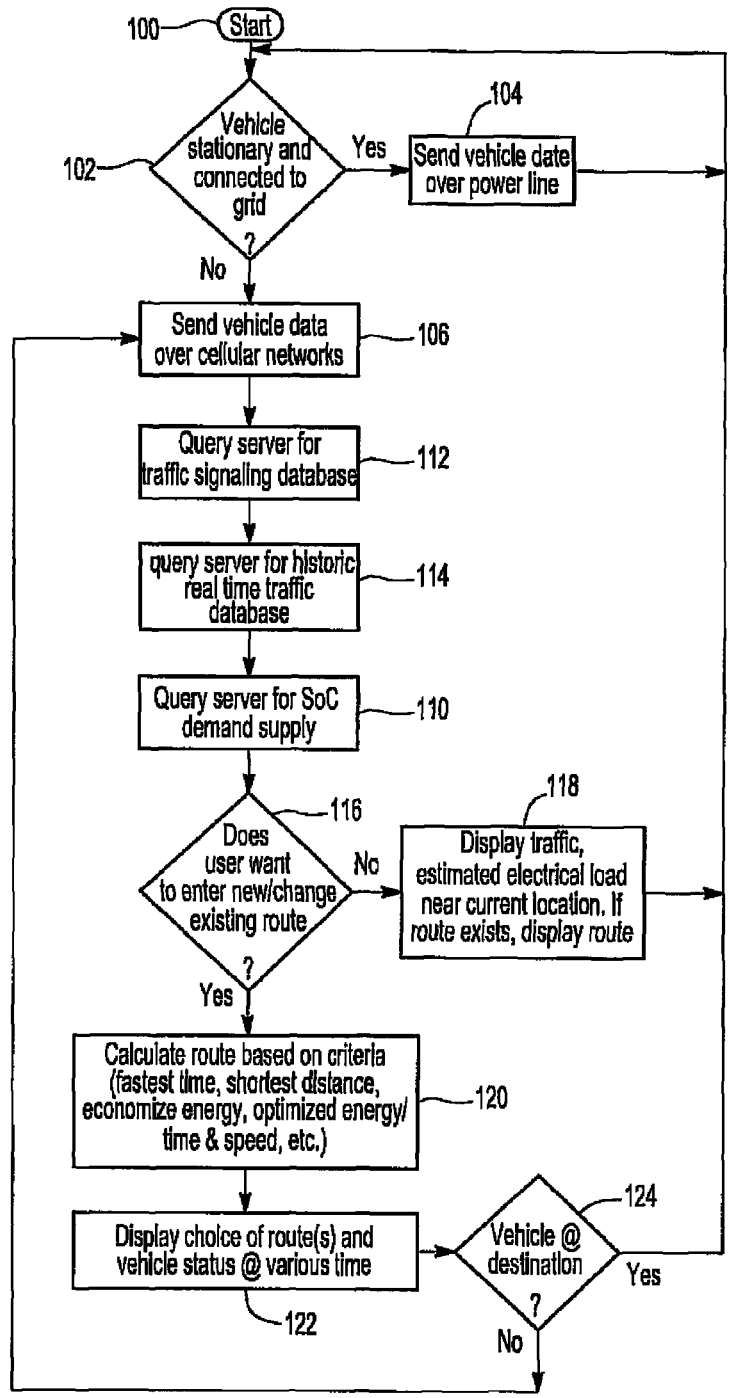
FIG. 8 is a flowchart illustrating an aspect of the present invention.

With reference now to FIG. 8, a flowchart is there illustrated illustrating the operation of rerouting of the vehicles 20. After initiation at step 100, step 100 proceeds to step 102 where it is determined if the vehicle is connected to the power utility grid. If so, step 102 exits to step 104 where the vehicle transmits its data over the power line and then returns to step 102. Otherwise, step 102 proceeds to step 106.

At step 106 the vehicle transmits its data to the base station 30 by using the transmitter 28. Also during this period the base station processor 54 queries a traffic signaling database to receive traffic signal data at step 112 as well as a historic or statistical real time database information at step 114 around the current location of the vehicle, along the calculated route or for the map area displayed on the screen. The program then proceeds to step 116 where the user is queried as to whether the user wants to enter a new route. If not, step 116 proceeds to step 118 where the traffic, estimated electrical load at the current location, and the route are displayed on the navigation system 46. Step 118 then branches back to step 102.

If the user does want to enter a new route, step 116 instead branches to step 120 where a new route is calculated based upon any desirable criteria, such as fastest time, shortest distance, most economical, optimized energy, etc. Step 120 then proceeds to step 122 where one or more routes are displayed on the navigation system 46. Step 122 then proceeds to step 124 which determines if the vehicle is at the destination. If so, step 124 branches back to step 102. Otherwise, step 124 branches back to step 106.

The rerouting of the vehicle may also take into account the different power options available for the operation of the electric vehicle. For example, the rerouting option may take into consideration the options for the shortest time, shortest distance, minimum energy, or optimized energy for the electric vehicle.

Most, if not all, electric vehicles today have a provision for setting the vehicle into different driving modes. These different driving modes include at the very least the power mode and an economy mode.

Figure 9:
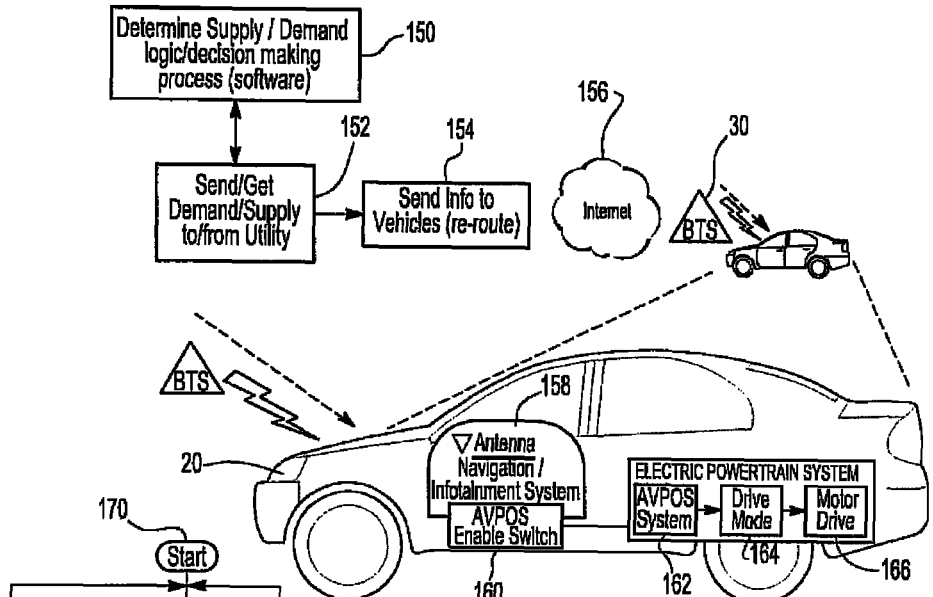
FIG. 9 is a diagrammatic view illustrating rerouting of the system utilizing selectable power modes.

Once the rerouting data is sent to the vehicle, the vehicle itself may have an option or setting in the vehicle infotainment or navigation system in which the user specifies that the system may take over and act in a way that the vehicle electric driving mode is changed automatically according to the situation or conditions and still ensure that enough battery state of charge is available for the vehicle to drive safely to the nearest charging spot or to its origin. For example, this would enable a senior citizen or older passengers who have some difficulty comprehending the infotainment or navigation system visual feedback or, optionally, would work as a luxury option for other consumers. For example, with reference to FIG. 9, at step 150 the base station 30 obtains the demand/supply data from the public utility and then proceeds to step 152. At step 152 the base station determines the supply/demand available from the various power grids. Step 154 then sends the rerouting data to the vehicles optionally via the Internet 156.

The rerouting data is received by the navigation/infotainment system 158 in the vehicle 20. The vehicle 20 also contains an automatic vehicle performance optimization system (AVPOS) switch 160 which may, for example, comprise an option on the screen of a navigation/infotainment system 158. If enabled, the AVPOS system 162 then determines the appropriate drive mode 164 to control the motor drive for the vehicle in accordance with the optimized driving performance.

Figure 10:
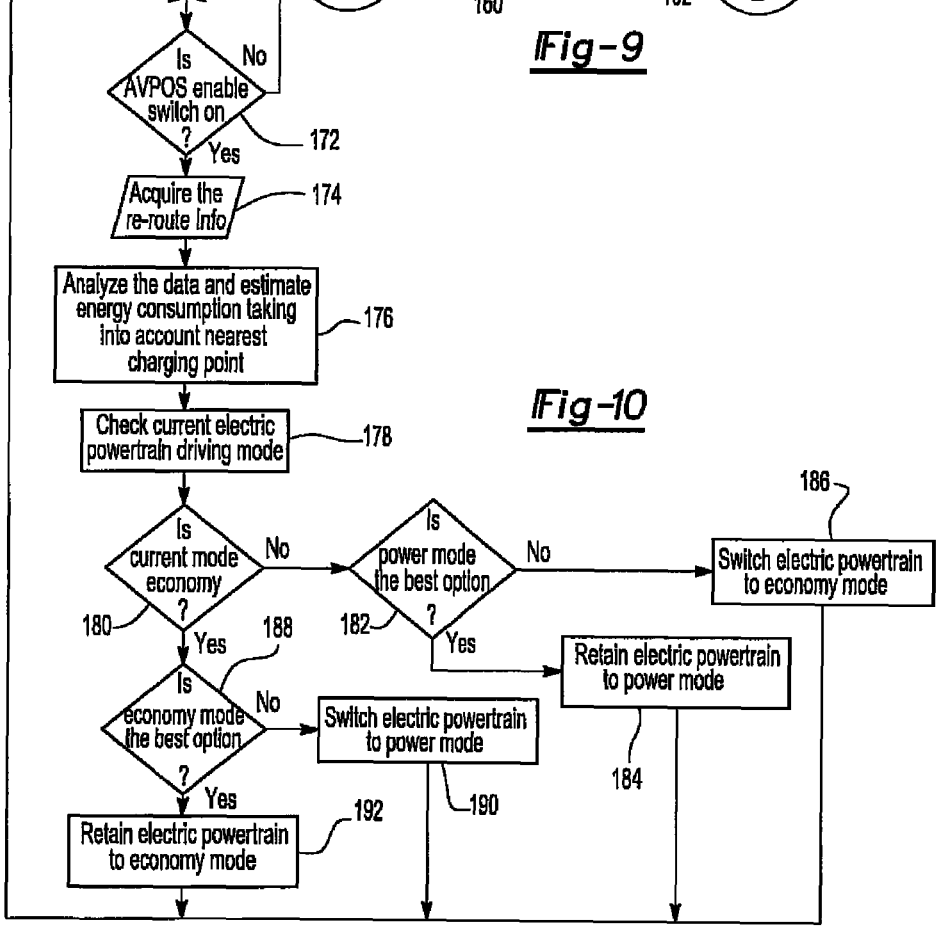
FIG. 10 is a flowchart illustrating the operation of the automatic selection of the operating mode for the vehicle.

With reference now to FIG. 10, a flowchart illustrating the operation of the AVPOS system is shown. After initiation of the system at step 170, step 170 proceeds to step 172 which determines if the AVPOS switch 160 has been activated. If not, step 172 simply loops back to itself so that the AVPOS system 162 remains disabled.

However, if the AVPOS switch 160 has been activated, step 172 instead branches to step 174 where the navigation system 158 obtains the rerouting information from the base station 30. Step 174 then proceeds to step 176.

At step 176, the AVPOS system 162 analyzes the data and energy consumption in conjunction with the nearest charging point available to the vehicle 20. Step 176 then proceeds to step 178 which determines the current electrical power train driving mode, e.g. economy mode or power mode, and then proceeds to step 180.

At step 180, the AVPOS system 162 determines if the vehicle is in the economy mode for driving. If not, step 180 proceeds to step 182 and determines if the power mode is the best option. If so, step 182 branches to step 184 which retains the drive mode 164 in the power mode configuration and then branches back to step 172 where the above process is repeated.

Conversely, if the power mode is not the best drive mode, step 182 instead branches to step 186 where the drive mode 164 is switched to the economy mode. Step 186 then proceeds back to step 172 where the above process is repeated.

Conversely, if the vehicle is currently in the economy mode, step 180 instead branches to step 188 where it is determined if the economy mode is the best option. If not, step 188 branches to step 190 where the AVPOS system 162 switches the drive mode 164 to the power mode configuration. Step 190 then branches back to step 172.

Lastly, if the economy mode remains the best mode of operation, step 188 proceeds to step 192 where the AVPOS system 162 retains the economy mode for the drive mode 164. Step 192 then branches back to step 172.

From the foregoing, it can be seen that the present invention provides a system for managing electrical power requirements between at least two power grids as a function of the number of electric vehicles requiring recharging in a particular grid.

Having described our invention, however, many modifications thereto will become apparent to those skilled in the art to which it pertains without deviation from the spirit of the invention as defined by the scope of the appended claims.

We claim:

1. An electric vehicle communicating with a base station for managing electrical power requirements between at least two power grids comprising:
    an electric motor which propels the vehicle at least partly during the operation of the vehicle,
    an electric battery to power the electric motor contained on the vehicle,
    a wireless transmitter,
    a processor configured to communicate the state of charge of the battery, vehicle identification information and vehicle destination information to said transmitter, said transmitter transmitting said state of charge of the battery, vehicle identification information and vehicle destination information,
    a navigation system configured to display a route information based on a vehicle rerouting data transmitted from said base station,
    wherein the base station comprising:
    a receiver configured to receive said state of charge of the battery, vehicle identification information and vehicle destination information from said vehicle,
    a base station processor configured to receive said state of charge of the battery, vehicle identification information and vehicle destination information received from said vehicle and estimate geographic power requirements to recharge said battery at the destination or waypoint of the vehicle,
    said base station processor being further configured to provide data for the redirection of power among the at least two power grids as a function of said geographic power requirements,
    wherein base station transmits vehicle rerouting data to said navigation system determined as a function of the available electrical power on said at least two power grids.

2. The electric vehicle as defined in claim 1 wherein said wireless transmitter comprises a cellular telephone.

3. The electric vehicle as defined in claim 1 wherein said base station processor has access to a database containing historical data on the electrical power requirements and locations of said vehicle during recharging of the vehicle batteries.

4. The electric vehicle as defined in claim 3 wherein said base station processor is configured to estimate said electrical power requirements as a function of the day of the week.

5. The electric vehicle as defined in claim 3 wherein said base station processor is configured to estimate said electrical power requirements as a function of the time of day.

6. The electric vehicle as defined in claim 1 wherein said base station is configured to estimate said electrical requirements as a function of environmental factors.

7. The electric vehicle as defined in claim 1 wherein each vehicle is operable under at least two different driving modes, said base station configured to determine an optimized driving mode and said vehicle containing a circuit to automatically set said vehicle to said optimized driving mode.

8. A method for displaying the route information in an electric vehicle communicating with a base station managing electrical power requirements between at least two power grids, wherein the vehicle comprising an electric motor which propels the vehicle at least partly during the operation of the vehicle and an electric battery to power the electric motor, a wireless transmitter, the method comprising:
    wirelessly transmitting the state of charge of the battery, vehicle identification information and vehicle destination information,
    receiving the state of charge of the battery, vehicle identification information and vehicle destination information at a base station,
    estimating the geographic power requirements to recharge said batteries at the destination or waypoint of the vehicles as a function of the state of charge of the battery, vehicle identification information and vehicle destination information received from said vehicles vehicle,
    redirecting power among the at least two power grids as a function of said geographic power requirements,
    transmitting vehicle rerouting data to said vehicle system determined as a function of the available electrical power on said at least two power grids,
    displaying a route information on a navigation system based on a vehicle rerouting data transmitted from said base station.

9. The method as defined in claim 8 and further comprising the steps of:
    maintaining a historical database of the geographic power requirements of the at least two power grids,
    accessing said historical database to estimate the power requirements of said at least two power grids.

10. The method as defined in claim 8 wherein said historical database contains power grid requirements as a function of the day of the week.

11. The method as defined in claim 8 wherein said historical database contains power grid requirements as a function of the time of day.

12. The method as defined in claim 8 wherein said estimating step further comprises the steps of estimating the number of vehicles within the geographic area of each power grid, and estimating the likelihood that the vehicles will be electrically connected to the grid at a selected time.

* * * * *